(12) United States Patent
Wong et al.

(10) Patent No.: US 9,816,485 B2
(45) Date of Patent: Nov. 14, 2017

(54) SHOCK SENSOR FOR WIND TURBINE GENERATOR

(75) Inventors: Lip Pang Wong, Singapore (SG); Hans Brorsen, Hadsten (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 937 days.

(21) Appl. No.: 13/997,846

(22) PCT Filed: Dec. 22, 2011

(86) PCT No.: PCT/DK2011/050514
§ 371 (c)(1),
(2), (4) Date: Oct. 14, 2013

(87) PCT Pub. No.: WO2012/089215
PCT Pub. Date: Jul. 5, 2012

(65) Prior Publication Data
US 2014/0042746 A1   Feb. 13, 2014

(30) Foreign Application Priority Data
Dec. 29, 2010   (DK) .................................. 2010 70589

(51) Int. Cl.
*F03D 7/02*   (2006.01)
*G01H 1/00*   (2006.01)
(Continued)

(52) U.S. Cl.
CPC ............ *F03D 7/0296* (2013.01); *F03D 17/00* (2016.05); *G01H 1/00* (2013.01); *G01H 1/003* (2013.01);
(Continued)

(58) Field of Classification Search
CPC ........................... F03D 7/0264; F03D 7/0296
(Continued)

(56) References Cited

U.S. PATENT DOCUMENTS

| 3,685,604 A | 8/1972 | Smith et al. |
| 4,050,236 A * | 9/1977 | Jauch ................. G04B 45/0053 368/181 |

(Continued)

FOREIGN PATENT DOCUMENTS

| DE | EP 2357356 A2 * | 8/2011 | ............... F03D 1/06 |
| JP | 2-026398 A | 1/1990 | |

(Continued)

OTHER PUBLICATIONS

Danish Search Report, PA 2010 70589, dated Sep. 8, 2011.
International Search Report, PCT/DK2011/050514, dated Jan. 30, 2013.

*Primary Examiner* — Sean J Younger
(74) *Attorney, Agent, or Firm* — Patterson + Sheridan, LLP

(57) ABSTRACT

A vibration sensor (5) mountable to a wind turbine generator for detecting excessive vibration of the wind turbine generator, the sensor comprising a pendulum having a pendulum bob (25) of pre-determined mass coupled to a detection switch (10), the detection switch arranged to detect oscillation of the pendulum exceeding a predetermined oscillation threshold; said pendulum bob selectively adjustable along said pendulum so as to vary the oscillation threshold of said sensor; wherein the sensor is arranged to exceed the oscillation threshold on receiving a forced vibration corresponding to a vibration threshold of the wind turbine generator.

12 Claims, 2 Drawing Sheets

(51) Int. Cl.
*G01H 1/16* (2006.01)
*G01H 17/00* (2006.01)
*F03D 17/00* (2016.01)

(52) U.S. Cl.
CPC .............. *G01H 1/16* (2013.01); *G01H 17/00* (2013.01); *F05B 2270/334* (2013.01); *F05B 2270/80* (2013.01); *F05B 2270/807* (2013.01); *Y02E 10/723* (2013.01)

(58) Field of Classification Search
USPC .......................................... 416/1, 35, 37, 16
See application file for complete search history.

(56) References Cited

U.S. PATENT DOCUMENTS

| | | | | |
|---|---|---|---|---|
| 4,083,651 | A * | 4/1978 | Cheney, Jr. | ........... F03D 7/0224 416/11 |
| 2008/0181761 | A1 | 7/2008 | Moore et al. | |
| 2009/0263245 | A1 * | 10/2009 | Shi | ............................. F03D 7/02 416/43 |
| 2010/0133827 | A1 * | 6/2010 | Huang | .................. F03D 7/0224 290/44 |
| 2010/0135791 | A1 * | 6/2010 | Melius | .................. F03D 7/0224 416/1 |
| 2010/0314883 | A1 * | 12/2010 | Ollgaard | ................. F03D 11/00 290/55 |

FOREIGN PATENT DOCUMENTS

| | | | |
|---|---|---|---|
| JP | H05223631 | A | 8/1993 |
| JP | H06119855 | A | 4/1994 |

\* cited by examiner

SHOCK SENSOR FOR WIND TURBINE GENERATOR

FIELD OF THE INVENTION

The invention relates to wind turbine generators and in particular systems and methods for detecting excessive vibration.

BACKGROUND

Being a rotary machine, wind turbine generators (WTG's) are subject to cyclical loads and stress variations over long periods. Vibration from this cyclical variation may result from the rotor, rotor shaft, shaft bearings or other components of the WTG.

Whilst vibration within a wind turbine generator will occur during normal operating conditions, it is of concern if this vibration approaches the resonant frequency for any particular component of the WTG assembly. Under normal operating conditions or under anticipated variations to normal operating conditions, measures can be taken to address the potential for resonance through varying the moment of inertia of the rotor and/or nacelle. Further, dampening systems can be incorporated into the assembly at strategic locations about the nacelle.

Unfortunately, should an unanticipated event occur and the system approach a resonant frequency, significant damage can occur in a very short space of time. Further, many of the conventional sensors on the wind turbine generator, such as rotor speed, the shaft speed, power output etc, may not register a fault until significant damage has occurred. Consequently, the speed of response to an adverse sensor reading may be too slow to react to excessive vibration.

It is therefore an object of the present invention to provide a means by which vibration can be measured and acted upon before significant damage occurs.

SUMMARY OF INVENTION

In a first aspect the invention provides a vibration sensor mountable to a wind turbine generator for detecting excessive vibration of the wind turbine generator, the sensor comprising a pendulum having a pendulum bob of predetermined mass coupled to a detection switch, the detection switch arranged to detect oscillation of the pendulum exceeding a predetermined oscillation threshold; said pendulum bob selectively adjustable along said pendulum so as to vary the oscillation threshold of said sensor; wherein the sensor is arranged to exceed the oscillation threshold on receiving a forced vibration corresponding to a vibration threshold of the wind turbine generator.

In a second aspect the invention provides a method of detecting a vibration threshold of a wind turbine generator has been exceeded, the method comprising the steps of: mounting a vibration sensor to the wind turbine generator, said sensor comprising a pendulum having a pendulum bob movable along said pendulum; said sensor receiving a forced vibration corresponding to the vibration threshold of the wind turbine generator, and consequently; oscillating said pendulum so as to exceed an oscillation threshold of said sensor; said oscillation triggering a detection switch mounted to said pendulum.

Accordingly, a vibration sensor having the pendulum arrangement according to the present invention acts as a direct measure of vibration. By connecting the pendulum to a detection switch, excessive vibration will lead to an actionable trigger much earlier than other measured parameters of operation of the wind turbine generator.

The vibration sensor functions by mounting to the nacelle, or a specific component of the wind turbine generator, which may be subject to vibration above a predetermined vibration threshold. The vibration of the WTG, or component, creates a forced vibration applied to the sensor which consequently oscillates in response. The sensor is configured such that on the pendulum reaching a predetermined oscillation threshold, the detection switch is activated which then sends an actionable signal.

In a further embodiment, actions which may be taken on receiving the actionable signal include a shut down of the wind turbine generator.

Alternatively, any one of several actions or a combination of actions may occur including a message being sent to a central control, a braking of the rotor shaft to reduce shaft speed and feathering of the blades of the rotor so as to reduce the rotor speed.

In a further embodiment, the sensor may be calibrated so as to accurately establish a relationship between the vibration threshold and the oscillation threshold. That is, if the WTG exceeds the vibration threshold, the corresponding forced vibration applied to the sensor results in the pendulum oscillating so as to exceed the oscillation threshold.

In a further embodiment, the pendulum bob of the pendulum may be adjustable so as to facilitate the calibration. Thus, the sensor may be usable for a variety of different WTG's and conditions. In this embodiment, the pendulum shaft of the pendulum may be graduated so as to move the pendulum bob to the desired graduation on the shaft. Alternatively, the pendulum bob may be replaced with a different mass in order to achieve the desired orientation.

Further, the calibration may be performed in a laboratory and so the graduation may be used to ensure the sensor is mounted to the WTG in a manner consistent with the orientation used for the calibration.

The detection switch may be a limit switch, an optical switch, an optical encoder or other appropriate sensor capable of recording the oscillation of the pendulum exceeding the oscillation threshold.

In one embodiment, determining the vibration threshold may be as a result of model testing or calculation of the moment of inertia (J) of components of the WTG. As the moment of inertia of the rotor may be the dominant factor in the total, the vibration threshold may be calculated based on an estimated value from the rotor alone.

BRIEF DESCRIPTION OF DRAWING

It will be convenient to further describe the present invention with respect to the accompanying drawing that illustrates a possible arrangement of the invention. Other arrangements of the invention are possible and consequently the particularity of the accompanying drawing is not to be understood as superseding the generality of the proceeding description of the invention.

DETAILED DESCRIPTION

Figure 1:
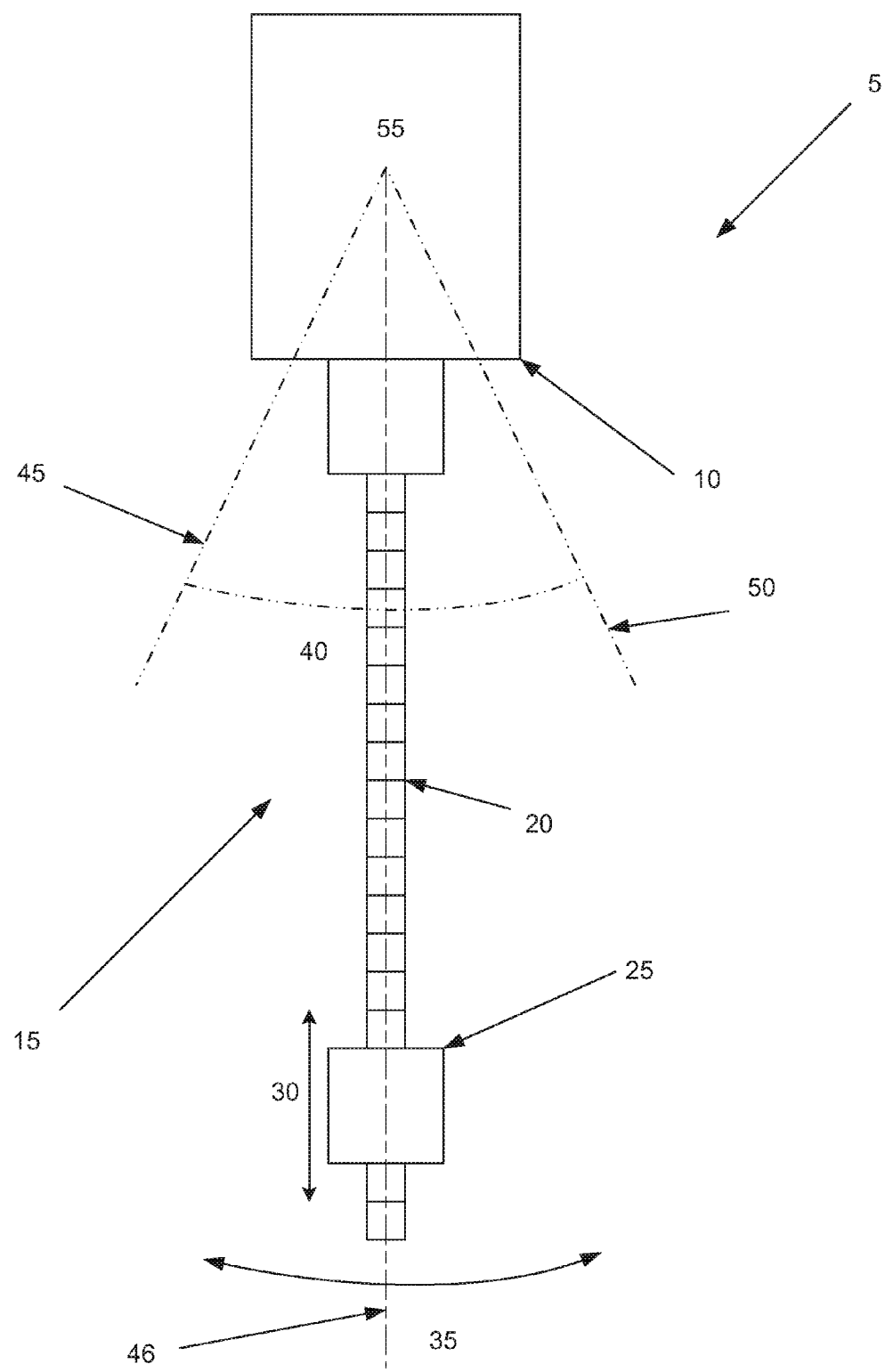
FIG. 1 is an elevation view of a vibration sensor according to one embodiment of the present invention.
Figure 2:
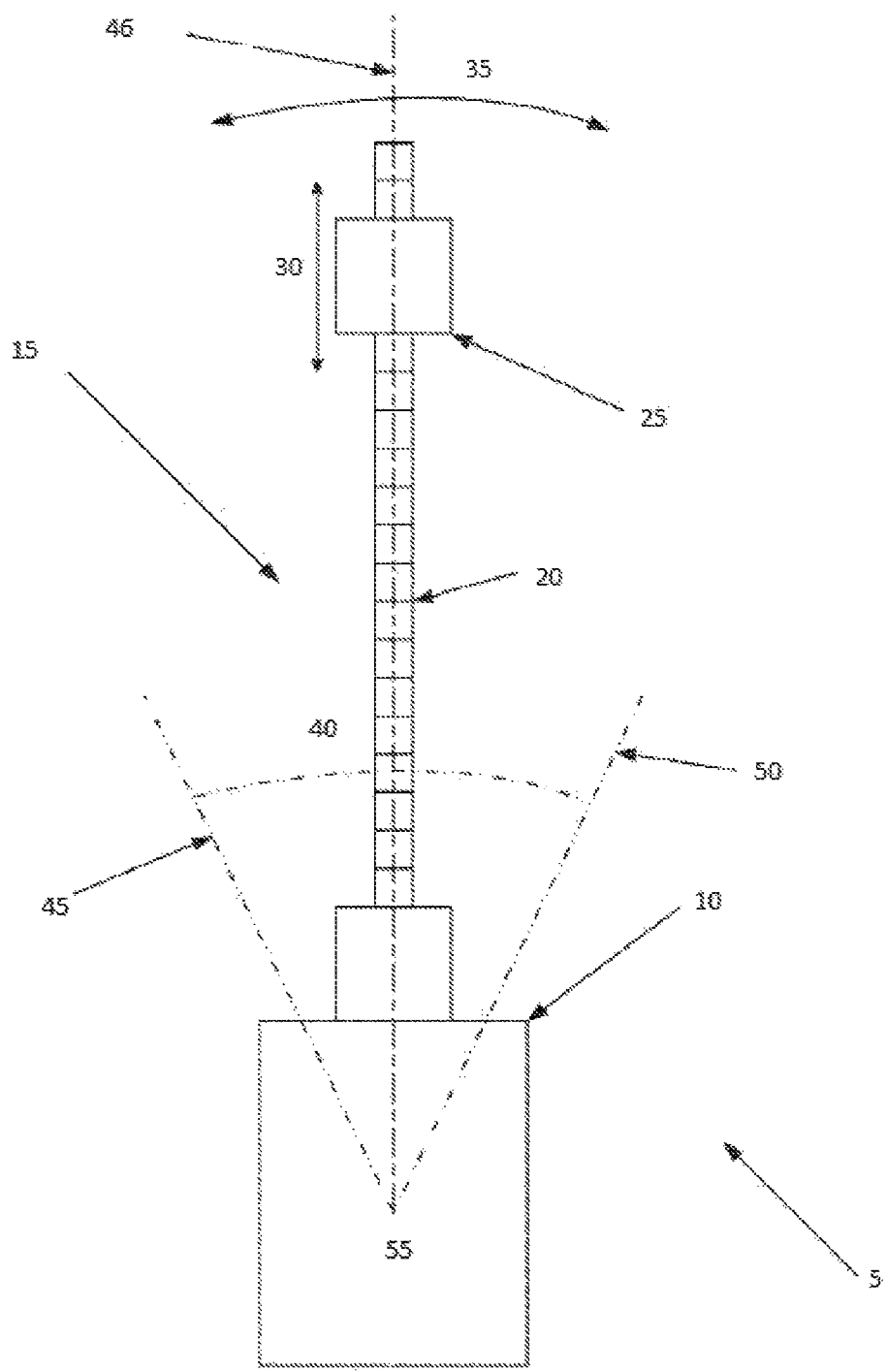
FIG. 2 is an elevation view of a vibration sensor according to one embodiment of the present invention.

FIG. 1 shows a vibration sensor 5 which is mountable to a wind turbine generator for detecting excessive vibration of the generator assembly. The sensor comprises a pendulum having a shaft 20 oscillating about a centre of rotation 55 and having a pendulum bob 25 mounted adjacent to an opposed end of the shaft 20. The centre of rotation 55 lies within a limit switch 10 which operates to detect when the oscillation of the pendulum exceeds the maximum amplitude 45, 50 as the pendulum swings 35 about the centre of rotation 55. A vertical axis defines the equilibrium position 46 of the pendulum, which in this case is directed downwards. It will be appreciated that a sensor having an equilibrium position directed upwards and so functioning similar to a metronome, whereby the forced vibration causes the upwardly directed pendulum to oscillate may also be possible within the scope of the invention, as shown in FIG. 2.

The limit switch 10 is arranged to send an actionable signal to a controller (not shown) to perform a particular action on the wind turbine generator. For instance, on receiving the signal the controller may shut down the generator so as to prevent or limit further damage being caused by the excessive vibration. Alternatively, the controller may perform less stringent actions to limit further damage such as applying a brake to the rotor shaft, feathering the blades of the rotor so as to reduce the input power, disengage the rotor from the shaft through a clutch arrangement (not shown).

The sensor may be mounted inside or outside the nacelle, subject to the area of concern. By mounting the sensor 5 to the wind turbine generator, the generator vibration is transferred to the sensor 5 as a forced vibration causing an oscillation 35 of the pendulum. The sensor 5 may be calibrated so as to exceed the oscillation threshold, defined by oscillation limits 45, 50 of the limit switch 10, on receiving the forced vibration corresponding to a vibration threshold of the generator.

For the purposes of the present invention, vibration of components of the wind turbine generator refers to all components within the structure, including the tower.

To this end, the sensor may be placed on an underside of the nacelle, so as to be proximate to components within the nacelle to be monitored. This position also allows monitoring of the tower itself, with the proximity of the sensor to the tower in this position allowing sensing of tower vibration.

Alternatively, the sensor may be placed directly on the tower, such as the top adjacent to the nacelle. This position may be particularly useful if the primary concern is vibration of the tower or associated tower components.

Calibration of the sensor 5 may occur through applying a corresponding forced vibration to the sensor 5 under controlled conditions, such as in a laboratory.

By adjusting the position 30 of the pendulum bob 25 up and down the pendulum, the oscillation threshold corresponding to the force vibration representing the vibration threshold can be defined by the limits 45, 50 of the limit switch. To ensure that the sensor 5 is installed in a manner consistent with the calibration, the pendulum 15 includes graduations 20 along the pendulum so that the mass is correctly positioned.

It will be appreciated that dimensions of the sensor, including the specified mass will depend upon factors including oscillation threshold and the component in question.

The invention claimed is:

1. A vibration sensor mountable to a wind turbine generator for detecting excessive vibration of the wind turbine generator, the sensor comprising:
a pendulum having a pendulum bob of pre-determined mass, wherein the pendulum is coupled to a detection switch, the detection switch arranged to detect oscillation of the pendulum exceeding a non-zero oscillation threshold;
said pendulum bob selectively adjustable along said pendulum so as to vary the non-zero oscillation threshold of said pendulum;
wherein the pendulum is arranged to exceed the non-zero oscillation threshold on receiving a forced vibration corresponding to a vibration threshold of the wind turbine generator, wherein the vibration threshold is determined based on calculating the moment of inertia of one or more components of the wind turbine generator, and wherein the detection switch generates a signal to shut down the wind turbine generator in response to detecting oscillation of the pendulum exceeding the non-zero oscillation threshold.

2. The vibration sensor according to claim 1 wherein said detection switch includes a limit switch arranged to transmit a signal to a controller.

3. The vibration sensor according to claim 2, wherein the controller is configured to apply a brake to a shaft of the wind turbine generator in response to the received signal, so as to reduce the speed of the shaft.

4. The vibration sensor according to claim 1, wherein the detection switch includes any one of: a limit switch, an optical switch or an optical encoder.

5. The vibration sensor according to claim 1 wherein the sensor is mountable to an underside of a nacelle of the wind turbine generator.

6. The vibration sensor according to claim 1 wherein the sensor is mountable to a tower supporting a nacelle of the wind turbine generator.

7. The vibration sensor according to claim 1 wherein the sensor is arranged so as to have an equilibrium position of the pendulum directed downwards.

8. The vibration sensor according to claim 1 wherein the sensor is arranged so as to have an equilibrium position of the pendulum directed upwards.

9. A method of detecting that a vibration threshold of a wind turbine generator has been exceeded, the method comprising:
mounting a vibration sensor to the wind turbine generator, said sensor comprising a pendulum having a pendulum bob movable along said pendulum;
said sensor receiving a forced vibration corresponding to the vibration threshold of the wind turbine generator, wherein the vibration threshold is determined based on calculating the moment of inertia of one or more components of the wind turbine generator, and consequently;
oscillating said pendulum so as to exceed a non-zero oscillation threshold of said pendulum;
said oscillation exceeding the non-zero oscillation threshold of said pendulum triggering a detection switch mounted to said pendulum; and
shutting down the wind turbine generator in response to said oscillation exceeding the non-zero oscillation threshold of said pendulum.

10. The method according to claim 9 further including:
said detection switch transmitting a signal to a controller and;
said controller controlling the wind turbine generator to reduce said vibration.

11. The method according to claim 10 wherein said controlling include at least one of:
shutting down the wind turbine generator, and;

disengaging a rotor from a shaft of the wind turbine generator, and;

feathering blades of the rotor, and;

applying a brake to the shaft so as to reduce the speed of the shaft.

12. The method according to claim 10, further comprising applying a brake to a shaft of the wind turbine generator in response to the received signal, so as to reduce the speed of the shaft.

\* \* \* \* \*